C. McBURNEY.

Improvement in the Manufacture of Flexible Rubber-Hose.

No. 126,069.                                           Patented April 23, 1872.

Witnesses

Inventor,
Charles McBurney

UNITED STATES PATENT OFFICE.

CHARLES McBURNEY, OF BOSTON, MASSACHUSETTS.

IMPROVEMENT IN THE MANUFACTURE OF FLEXIBLE RUBBER HOSE.

Specification forming part of Letters Patent No. 126,069, dated April 23, 1872.

To all whom it may concern:

Be it known that I, CHARLES McBURNEY, of Boston, in the county of Suffolk and State of Massachusetts, have invented an Improvement in the Manufacture of Flexible Hose or Tubing, of which the following is a full, clear, and exact description, reference being had to the accompanying drawing making part of this specification, in which—

Figure 1:
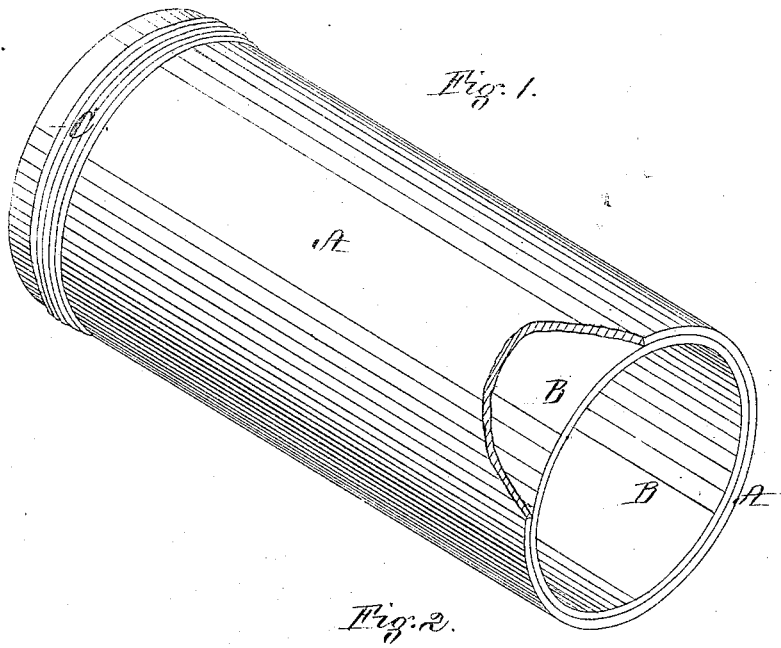
Figure 2:
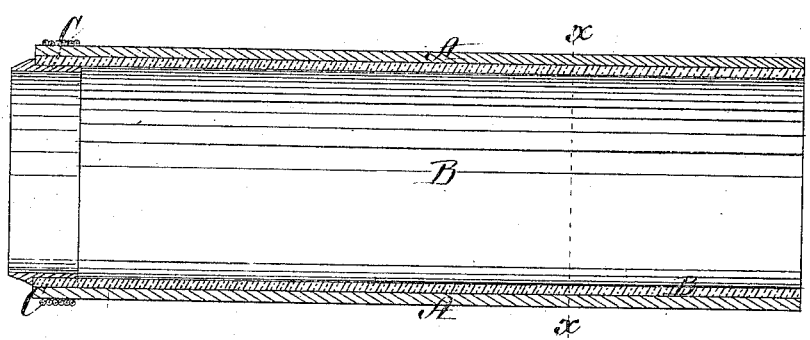
Figure 3:
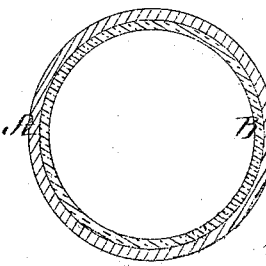

Figure 1 is a perspective view of a piece of hose made in accordance with my invention. Fig. 2 is a longitudinal section through the center of the same. Fig. 3 is a transverse section on the line $x\ x$ of Fig. 2.

Hose formed of woven fabric has been lined with a tube of rubber or rubber cloth cemented thereto, the cement being forced into the meshes of the woven material by means of steam, hot water, or hot air introduced within the lining. Where this hose was of considerable length, much difficulty was experienced in lining it in this manner, which was, moreover, expensive; and should the hose become ruptured at a particular point, the whole length or "joint" becomes useless, as it cannot be repaired, owing to the impossibility of withdrawing or detaching the inner tube from its exterior woven covering.

Hose has also been made of a strip of woven material, coated on one side with rubber, the edges of the strip so coated being riveted together in the same manner as leather hose. This method was, however, expensive, and hose so made was liable to leak along the line of the riveted seam, owing to the elasticity of the rubber lining.

My invention has for its object to obviate these difficulties; and consists in a hose of woven fabric lined with a tube of rubber or rubber cloth, the hose and its lining being entirely separate and independent of each other, and not cemented or otherwise united together.

To enable others skilled in the art to understand and use my invention, I will proceed to describe the manner in which I have carried it out.

In the said drawing, A represents a piece of seamless hose of cotton, linen, or other suitable woven fabric of sufficient strength to withstand the desired pressure, and having its interior lined with a tube, B, of rubber cloth to render it water-proof. The hose A and its lining B may be fitted together, either by drawing the hose over the lining or by drawing the lining into the hose, the relative diameters of the two being such that they will snugly fit each other when in place, no cement or other adhesive material being employed to attach or unite them together, consequently they may be readily separated, should it become necessary to repair either one or the other, or to provide an entire new lining B or exterior tube A, whereas hose provided with water-proof lining, as heretofore made, is rendered entirely useless if ruptured, as it cannot be repaired. Each end of the hose is provided with a coupling, C, secured in a well-known manner.

My invention is particularly applicable to hose of light description, such as that used in mills and other places where it is not subjected to rough usage, and my improved hose is exceedingly flexible, inexpensive, and durable, and will withstand heavy pressure.

I do not claim, broadly, water-proof hose, composed of an outer tube of woven fabric lined with rubber or rubber cloth; but What I do claim as my invention, and desire to secure by Letters Patent as a new article of manufacture, is—

Water-proof hose composed of a tube of woven fabric lined with a tube of rubber or rubber cloth, when the hose and its lining are entirely separate and independent of each other, and not cemented or otherwise united together, substantially as and for the purpose set forth.

Witness my hand this 16th day of March, A. D. 1872.

CHARLES McBURNEY.

In presence of—
P. E. TESCHEMACHER,
W. J. CAMBRIDGE.